United States Patent
Endt et al.

(10) Patent No.: US 9,625,039 B2
(45) Date of Patent: Apr. 18, 2017

(54) ELECTRIC MOTOR DRIVEN VALVE

(75) Inventors: Joerg Endt, Dresden (DE); Joerg Gassmann, Dresden (DE); Majid Bakhshi, Berlin (DE); Torsten Ettrich, Dresden (DE)

(73) Assignee: JOHNSON ELECTRIC S.A., Murten (CH)

( * ) Notice: Subject to any disclaimer, the term of this patent is extended or adjusted under 35 U.S.C. 154(b) by 164 days.

(21) Appl. No.: 13/586,329

(22) Filed: Aug. 15, 2012

(65) Prior Publication Data

US 2013/0043416 A1 Feb. 21, 2013

(30) Foreign Application Priority Data

Aug. 17, 2011 (DE) .................. 10 2011 110 384

(51) Int. Cl.
F16K 5/06 (2006.01)
F16K 31/05 (2006.01)
F16K 31/04 (2006.01)
F16K 27/06 (2006.01)

(52) U.S. Cl.
CPC .......... *F16K 5/0642* (2013.01); *F16K 5/0647* (2013.01); *F16K 5/0689* (2013.01); *F16K 27/067* (2013.01); *F16K 31/041* (2013.01); *F16K 31/055* (2013.01)

(58) Field of Classification Search
USPC ... 251/129.11, 180, 208, 249.5, 292, 315.07, 251/315.08, 315.09, 315.16, 129.12, 286, 251/288
See application file for complete search history.

(56) References Cited

U.S. PATENT DOCUMENTS

| | | | |
|---|---|---|---|
| 2,690,894 A * | 10/1954 | Blevans | 251/163 |
| 3,862,739 A | 1/1975 | Fujiwara | |
| 4,046,350 A | 9/1977 | Massey et al. | |
| 4,071,220 A | 1/1978 | Iino | |
| 4,206,904 A | 6/1980 | Dante | |
| 4,262,688 A | 4/1981 | Bialkowski | |
| 5,205,533 A * | 4/1993 | Berchem | 251/118 |
| 5,269,344 A * | 12/1993 | McHugh | 137/557 |
| 5,333,833 A * | 8/1994 | Reinicke | 251/77 |

(Continued)

FOREIGN PATENT DOCUMENTS

| | | | |
|---|---|---|---|
| DE | 1117958 B | * | 11/1961 |
| DE | 1 907 648 | | 8/1970 |

(Continued)

OTHER PUBLICATIONS

Machine tranlsation of DE 1117958 B.*

*Primary Examiner* — William McCalister
*Assistant Examiner* — Ian Paquette
(74) *Attorney, Agent, or Firm* — Muncy, Geissler, Olds & Lowe, P.C.

(57) ABSTRACT

An electric motor driven valve for use in gas meters, has at least one valve unit (V) with a valve body and a valve element, a drive unit (A) and a connection unit (S). The units (V, A, S) can be connected to each other and separated from each other, in a modular manner. The valve element is a spherical or cylindrical valve element that is sealed relative to the valve body by means of only one sealing element, which is preferably a lip seal. The valve body has two recesses in which the valve element is rotatably mounted.

21 Claims, 6 Drawing Sheets

(56) References Cited

U.S. PATENT DOCUMENTS

| | | | |
|---|---|---|---|
| 5,540,414 A | | 7/1996 | Giordani et al. |
| 5,566,923 A | * | 10/1996 | Ennis et al. ............. 251/315.04 |
| 6,371,440 B1 | * | 4/2002 | Genga et al. ............ 251/129.03 |
| 6,539,899 B1 | | 4/2003 | Piccirilli et al. |
| 6,994,309 B2 | * | 2/2006 | Fernandez-Sein ....... 251/129.04 |
| 7,131,635 B2 | | 11/2006 | Oh |
| 7,182,314 B2 | * | 2/2007 | Harvey et al. ............. 251/249.5 |
| 7,875,797 B2 | * | 1/2011 | Moser ............................ 174/50 |
| 8,113,484 B2 | * | 2/2012 | Hostetter et al. ............. 251/180 |
| 8,281,798 B2 | * | 10/2012 | Dalluge et al. ............ 137/15.22 |
| 2003/0030337 A1 | | 2/2003 | Aoki |
| 2008/0060706 A1 | | 3/2008 | Combs |
| 2010/0207046 A1 | * | 8/2010 | Wenchell et al. .......... 251/315.1 |
| 2011/0265886 A1 | * | 11/2011 | Dalluge ................ F16K 5/0689 137/15.22 |

FOREIGN PATENT DOCUMENTS

| | | | |
|---|---|---|---|
| DE | 26 09 446 | | 3/1977 |
| DE | 40 07 279 A1 | | 9/1991 |
| DE | 42 25 929 A1 | | 2/1994 |
| DE | 4230341 A1 | | 3/1994 |
| DE | 103 06 094 A1 | | 9/2003 |
| DE | 20 2006 001 060 U1 | | 6/2006 |
| EP | 1085181 A2 | | 3/2001 |
| GB | 1563333 A | * 3/1980 | ........... F16K 5/0668 |
| GB | 2237099 A | | 4/1991 |
| JP | 2006183822 A | | 7/2006 |
| WO | WO2007017832 A1 | | 2/2007 |

* cited by examiner

ELECTRIC MOTOR DRIVEN VALVE

CROSS REFERENCE TO RELATED APPLICATIONS

This non-provisional patent application claims priority under 35 U.S.C. §119(a) from Patent Application No. 10 2011 110 384.1 filed in Germany on Aug. 17, 2011.

FIELD OF THE INVENTION

This invention relates to electric motor driven valves and in particular, to an electric motor driven valve for use in a gas meter.

BACKGROUND OF THE INVENTION

Valves, especially ball valves of the aforementioned type, are generally known. They essentially comprise a housing, in which a valve ball is mounted as a blocking element. A channel that extends in the direction of gas flow within the valve ball serves as a flow guide in such valves. In an open position of the valve the input is connected to the output of the valve in the flow direction through the channel of the valve ball and they are isolated from each other in a closed position via the valve ball. In order to be able to rotate the valve ball from the open position to the closed position, the valve ball is connected to a trip shaft arranged essentially orthogonal to the flow direction to rotate the valve ball and the valve ball is rotatably mounted through two seals enclosing the valve ball. Because of the high friction caused by the two seals increased torque and therefore energy are required in order to move the ball. This makes the use of such solutions impossible or only possible with limitations in explosive-hazardous areas.

In the already known valves, which are used in the gas space and reach the open and closed position by means of a linearly movable piston, the essential drawback is that, when used as gas valves, they are opened or closed by means of a piston. In these linear solutions only a fraction of the energy is required for opening or closing in comparison with ball valves with two seals. However, a compact design of the valve is not possible here because of the stroke of the piston. At the same time higher pressure losses occur during flow of the gas than in ball valves. At high volumetric flow rates, which require greater diameter of the flow channel, such piston valves can only be used with limitations because of the large required space.

Prior art valves are already known, for example, from German Patent Application DE 42 30 341 A1, whose rotation of the valve ball from the closed position to the open position and vice versa occurs through an electromechanical drive. This rotational movement of a valve axis is transferred via a gear to a cam using a coupling connected to the ball cock. Maximum rotation of the ball cock by 90° is then admissible through the cam. In this case, two switches are required to control the motor to drive the valve axis.

A generic valve is also disclosed in U.S. Pat. No. 4,046,350, which is driven by means of a force actuator operated by an electric motor. The actuator is connected to a ball valve by means of a shaft. The shaft has gear teeth, which engage with teeth of a piston. Through longitudinal movement of the piston rotation of the shaft and therefore displacement of the ball valve by a maximum of 90° occurs. Other variants of valves are those in which a piston permits opening and closing of the channel through a linear movement. These known linear systems, however, have the drawback that they cause high pressure losses in the gas and restrict the maximum attainable flow. In addition, it is not possible or only insufficiently possible with valves of this design to continuously influence the gas flow by using intermediate positions, i.e., to operate in a modulating manner.

Another problem of the valves already known from the prior art is sealing of the ball valves. The valve ball is mounted in the housing via two bearing rings, which abut the valve ball on the front and rear in the flow direction of the fluid through the ball valve. An O-ring is provided in each bearing ring, which is supported on the outer peripheral surface of the valve ball. In order to guarantee that the O-ring ensures sealing even during slight movements of the valve ball, it is desirable that the O-ring be movable as a whole and forced against the valve ball surface by means of a spring force. This means that the present systems operate with demanding compensation mechanisms, for example, spring elements, or compensate for tolerances via high compression of the sealing elements. Because of this high power is required for movement from one position to another, which also has a particularly disadvantageous effect. The hazard of jamming of sealing elements is also high in such systems and/or long-term stability is lacking. The use of two O-rings is also not satisfactory, since high losses develop by friction at both locations.

A further drawback of gas valves known from the prior art is the fact that these gas valves are comprised primarily of metal components, which is naturally very cost-intensive. They are scarcely usable or adaptable for other systems, since an adapted solution of the valve system exists for each requirement with respect to power supply, which also leads to high development demands and also high costs during changes in specification. Simple and cost-effective assembly of the gas valves is also not present.

Another drawback of known valves relates to the fact that they are not suitable for battery operation owing to low efficiency of the motor drives. This means that the valves cannot be used directly in the gas phase or only with restriction.

Thus there is a need for a compact electric motor driven valve, which avoids the aforementioned drawbacks.

SUMMARY OF THE INVENTION

Accordingly, in one aspect thereof, the present invention provides an electric motor driven valve for use in gas meters comprising at least one valve unit (V) with a valve body and a valve element, a drive unit (A) and a connection unit, wherein the units (V, A, S) can be connected to each other and can be separated from each other.

Preferably, the valve element is a spherical or cylindrical valve element, which is sealed by means of only one sealing element relative to the valve element. Preferably, the valve body has two recesses in which the valve element is rotatably mounted. Optionally, protective electronics are provided, which prevent the development of an igniting spark.

This design, with only a single sealing element, leads to low internal friction and therefore low energy requirement and also significant cost reduction.

In a preferred embodiment of the invention the passage through the spherical or cylindrical valve element provided for gas flow is configured circular in cross section or deviating from a circular shape.

By deviation from a circular shape the flow resistance can be deliberately adjusted or influenced as a function of the position of the valve element. A desired dependence between rotation angle of the valve element and the gas flow resulting from this can thus be achieved, which is very advantageous, especially with respect to applications in modulating systems.

Preferably, the valve element has two stub axles arranged diametrically to each other and circular in cross section, which are formed on the side opposite the recess and can be introduced to the recess in the inside wall of the valve element. The recess is advantageously designed as a groove or channel, its configuration being adjusted to the shape or configuration and position of the stub axles of the valve element so that the stub axles are mounted to rotate stably in it. The valve element and the stub axles are preferably arranged symmetrically with reference to the orthogonal axis of the valve element so that a stable position of the valve element is achieved. The stable position, which guarantees tolerance compensation between the lip seal and the valve element, permits a reduction in the number of sealing elements from two sealing elements to one, i.e., it permits elimination of the second seal, which is arranged in the gas flow direction after the valve element.

Deviating from the symmetric arrangement of the stub axles with reference to the orthogonal axis of the valve element, these stub axles can also be arranged eccentrically to the orthogonal axis of the valve element. Because of this the lip seal is expanded in the open valve state, which again leads to lower necessary drive power because of the reduced friction. This can be particularly advantageous during battery operation.

As already mentioned, the valve element can be designed as a ball or rotatable cylinder, in which case the cylinder extends orthogonal to the flow direction of the gas and has a channel aligned orthogonal to the cylinder axis. By rotating the cylinder and therefore pivoting the channel into and out of the gas flow direction, the gas flow can be deliberately opened or closed. The version with a valve ball permits more compact configuration of the valve and is therefore preferred. The design details of a possible variant with a ball or cylinder are then very similar. Here again eccentric bearing, as previously described, is possible.

According to the present invention the modules can be connected to each other in modular fashion by at least one shape-mated connection and can also be released from each other. This modular design according to the invention into selectable connections, valve and drive unit or modules, which are formed from more than two modules, permits the valves to be adjusted cost-effectively to market and customer requirements and new specifications. In particular, the modular design permits a variety of variations to valve systems, which can be installed in plug-in fashion from one or more of the same and different modules, like valve unit/drive unit module or valve unit/connection unit, according to requirements. This design according to the invention also leads to simple and rapid replacement of interfaces and the drive unit, which significantly reduces the time and cost expenditure during maintenance work and increases suitability for repair. A change in power supply, normative classification of the application and an actuator choice adjusted to it, as well as different tightness requirements, are among the possible reasons for change. An adjustment of the valve element for different volumetric flow rates and pressure drops would be conceivable through different ball or cylinder diameters and size of the internal space of the valve housing. Installation on any interface is possible by a simple change in connection.

According to an advantageous embodiment of the valve, the shape-mated connections are designed as mating snap-on elements which engage in each other during closure and in so doing form a shape-mated connection. Positioning of a module or closure of the module by translational movement of a module onto the other module then occurs. In particular, it is advantageous if a module is merely mounted or clipped onto another module, for example, the valve housing from above. This permits automatic closure of both modules.

According to an advantageous embodiment the shape-mated connection of the modules includes at least two, preferably at least three or more, snap-on element pairs, since several snap-on element pairs permit multiple securing and therefore more reliable closure of the modules. Snap-on element pairs are understood to mean two snap-on elements that mutually produce shape-mating. However, it is conceivable, under some circumstances, to also understand snap-on element pairs to mean a number of snap-on elements that are viewed merely as one snap-on element pair owing to their similar configuration and same method of action.

Another possibility of shape-mated connection of the modules is offered by a bayonet closure in which the connection occurs via an insertion-rotary movement. The two parts being connected are joined by inserting one into the other and opposite rotation and are separated again in this way. A combination of snap-on and bayonet connections is also conceivable.

Preferably, the drive unit includes a gear mechanism, which is integrated in a module unit of the valve element after connection of the valve unit to the drive unit.

Preferably, the gear mechanism of the drive unit has a coupling piece, which includes two connectors, which rotate the valve ball between the open and closed positions. Because of this support position, the position of the valve ball can be controlled by the drive unit. The open position of the valve ball is when the input is connected to the output of the valve in the flow direction through the passage formed in the valve ball and the closed position is when the input and output are isolated from each other by the valve ball. In order to be able to rotate the valve ball from the open position to the closed position, the valve ball is mounted to rotate around an axis essentially perpendicular to the flow direction and is connected to a coupling piece of the drive unit.

Preferably, the coupling piece is preferably driven electromechanically by a worm gear drive of the drive unit. The drive unit includes a switch and a trip cam, designed so that the open and closed position of the valve ball is recognized with the switch. Passing beyond 90° is also prevented by the coupling piece traveling up to a stop on the valve housing. This design of the trip cam according to the invention is very advantageous, since it leads to a reduction in the number of switches to accomplish position recognition from two, as is known from the prior art, to one.

The switch for detecting the end position has a pin, in which the switch is designed so that the switching process occurs during entry of the pin. The coupling piece is mounted to rotate and is connected to the ball through the driver. The coupling piece or the worm gear of the gear mechanism also has at least one trip cam, which functions as a ramp for the pin of the switch and forces it into both end positions. Advantageously the coupling piece of the worm gear of the gear mechanism includes two trip cams, configured so that the pin of the switch is forced through the trip cam on the coupling piece in both the open and closed position and produces a signal. Through this embodiment combined with the additional information of the direction of rotation of the valve ball it can be precisely determined whether the ball is situated in the open or closed position.

In an advantageous embodiment of the invention the valve body also includes two recesses so that the coupling piece can be made with two connections and is connected in shape-mated fashion to the ball, in which case the recesses are designed so that they form a stop for the connections, which prevents passage beyond 90°.

The sealing element is preferably designed as a lip seal between the sealing element and the valve element. This shape of the sealing element reduces the pressure force with simultaneous improvement of the robustness relative to tolerance fluctuations and component errors. Because of its geometrically defined flexibility, it also offers long-term stability and tolerance compensation. All of this produces a low load and frictional torque, higher energy reserves in the drive and consequently longer lifetime during battery operation. Because of the low energy demands and the efficient and compact design it is possible to also operate this valve with a battery directly in the gas phase.

The valve element and/or the valve ball are preferably made from plastic so that the valve according to the invention can also be used within an explosion-hazardous and/or very corrosive atmosphere.

The switch is advantageously connected to a drive motor via a flat conductor, which has electronic components, for example, diodes so that protective measures can be taken that prevent formation of an igniting spark. Because of the employed flat conductor these electronic components can also be mounted directly on the electrically active elements (motor, switch) and within the gas space so that transfer of spark energy from the active elements into an ignitable gas/air mixture is optimally prevented. Through the chosen arrangement the now applicable safety conditions, for example, Atex, can be optimally satisfied.

Another advantageous variant of the valve is obtained, if the valve has a radio receiver or a radio receiver and radio transmitter in order to exchange information with a radio transmitter and/or radio receiver outside the gas meter. On this account a valve unit that does not penetrate the housing wall of the gas meter and is reliable in manipulation, fully operable with a battery and simple to integrate in the meter is obtained. The electronic components for the radio receiver and/or radio transmitter can then be advantageously arranged directly on the flat conductor or integrated in it, but the radio module can also be integrated differently in the valve.

Certain embodiments of the present invention provide an autonomously operating valve, which requires very little power for operation because of its design and can also be used within an explosion-hazardous atmosphere.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
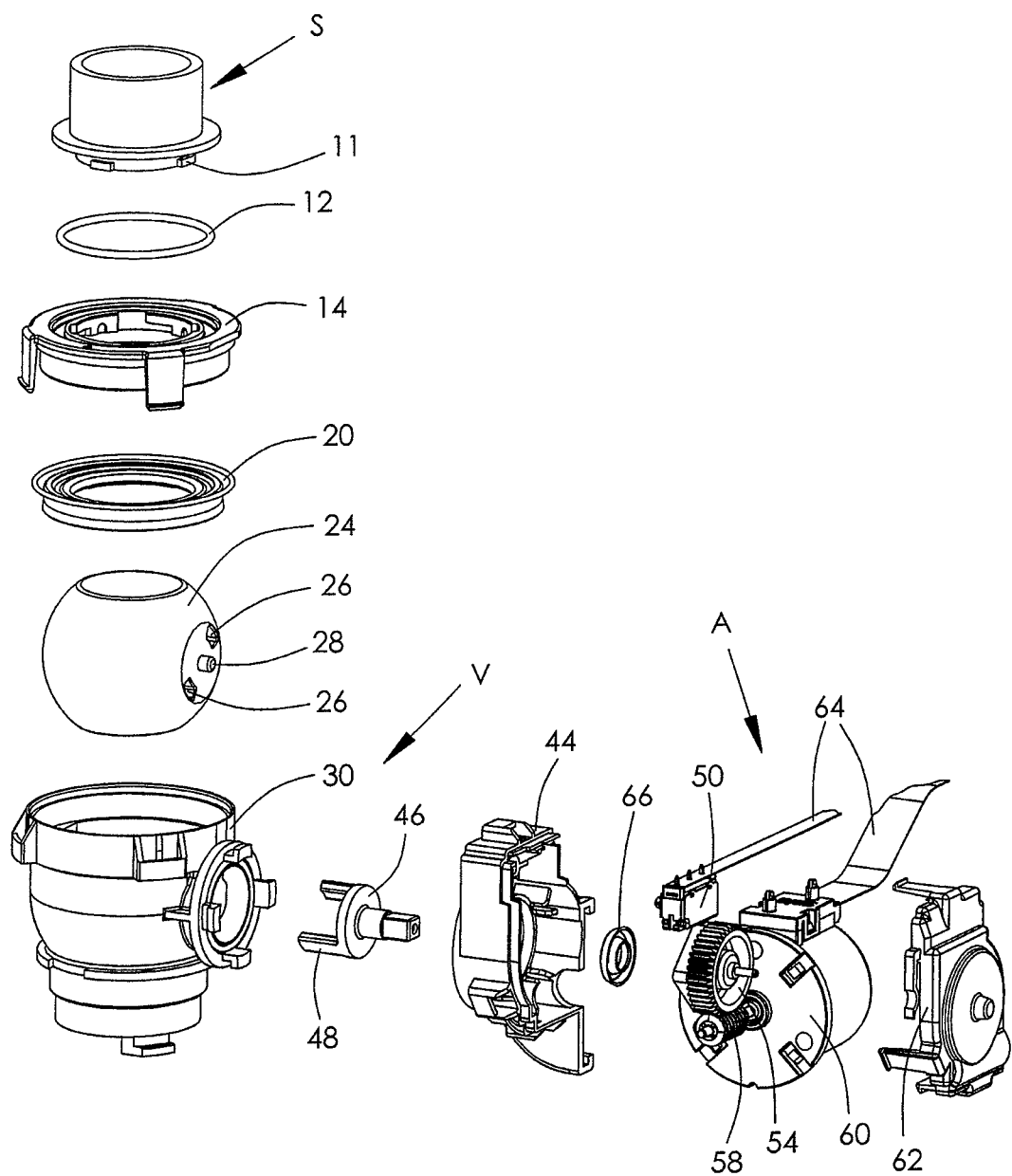
FIG. 1 is an exploded view of a modular gas valve, according to the preferred embodiment of the present invention.

FIG. 1 is an exploded view of the preferred embodiment of the modular design of the valve, according to the present invention. The following three modules can be seen in FIG. 1: a drive unit marked "A", a valve unit marked "V" and a connection unit marked "S", subsequently also referred to as connection piece. All modules have shape-mated connections to connect the module to at least another module. The shape-mated connections are either snap-on elements acting against each other and/or bayonet closures. The modules and their individual parts are shown separate from each other in the interest of clarity.

Figure 2:
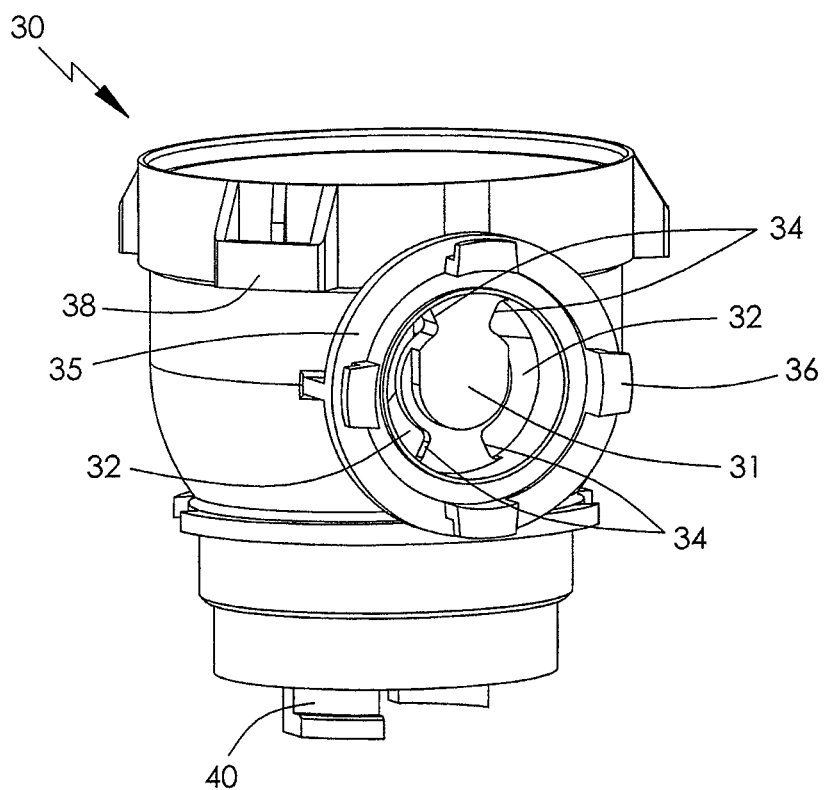
FIG. 2 shows a valve body, being a part of the valve of FIG. 1.

The valve unit "V" has a valve body 30, shown in detail in FIG. 2. The valve body 30 has a side recess 31 with has two openings 32 to accommodate an operating device for moving or operating a valve element 24. Circumferential ends of the openings 32 form stops 34, limiting the movement of the operating device, as will be described later. The valve element 24 is a valve ball in this embodiment, although a cylindrical valve element may be used. A connection adaptor in the form of a protruding collar 35 formed as one piece with the valve body 30 surrounds the side recess 31. Four snap-on elements 36 protruding symmetrically relative to each other are positioned along collar 35.

The valve body has a pathway extending there through from an inlet to an outlet defining a gas flow path. The valve body has three additional closures in the form of snap-on elements 38 on the outer edge of its upper end. Two additional closures in the form of bayonet elements 40 are arranged on the lower end of the valve body. The closures are arranged symmetric to each other, their arrangement and number are variable according to the invention. Through this arrangement of the closures and the compact design of the valve body, three modules (top, bottom and lateral) can be connected to the valve unit V. The valve body 30 is formed in one piece with the closure elements, preferably by injection molding.

Figure 3:
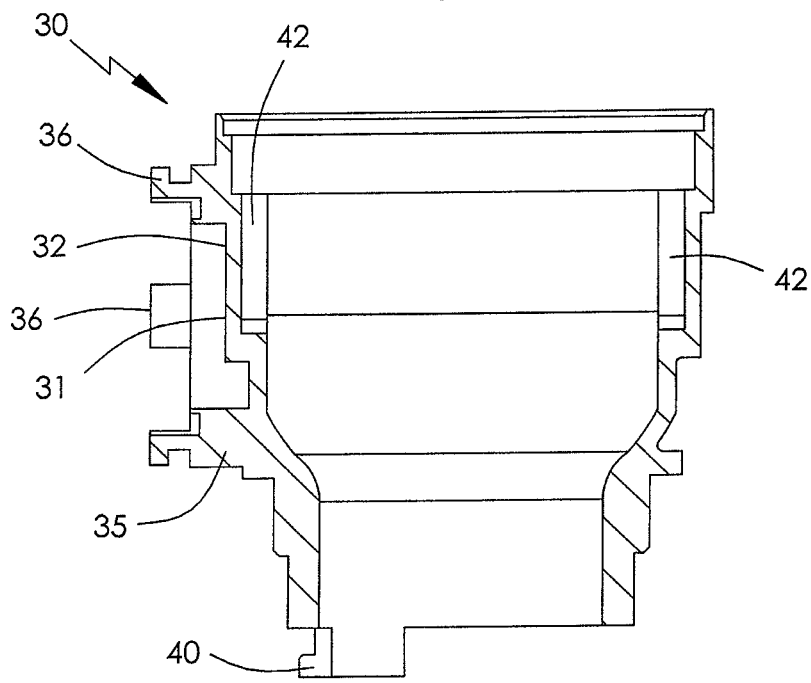
FIG. 3 is a cross section view of the valve body of FIG. 2.
Figure 5:
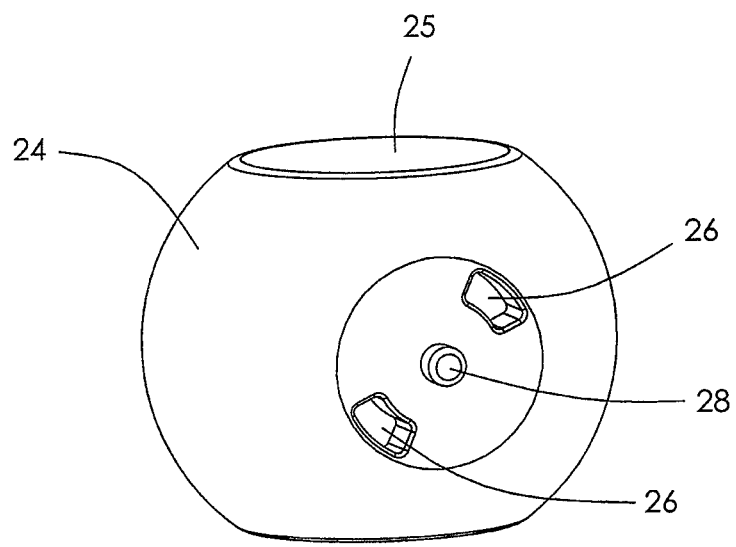
FIG. 5 shows a valve ball, being a part of the valve of FIG. 1.
Figure 5A:
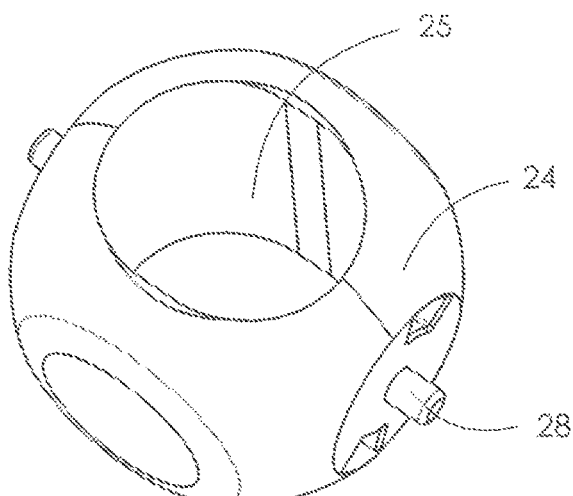
FIG. 5A shows a valve ball in accordance with another embodiment, being a part of the valve of FIG. 1.
Figure 5B:
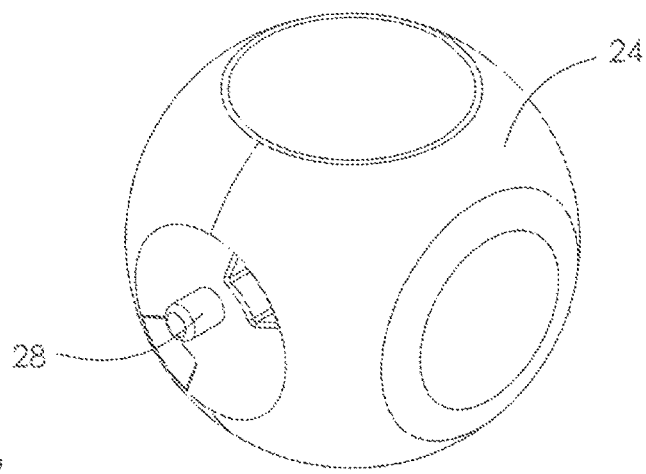
FIG. 5B shows the valve ball of FIG. 5A in another aspect.
Figure 5C:
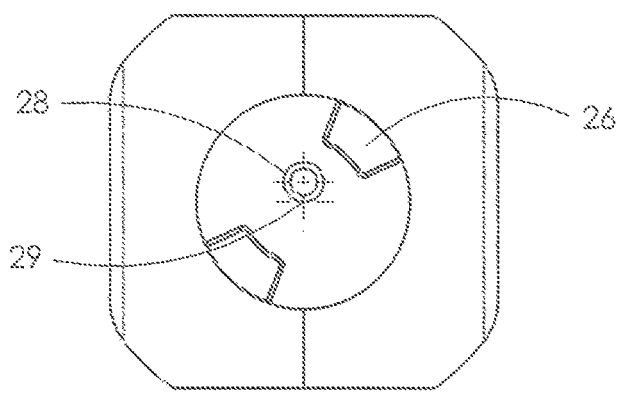
FIG. 5C is a front side view of FIG. 5B.

The inside wall of valve body 30 is shown in detail in the cross-sectional view of FIG. 3. It has two opposite recesses 42 in the form of grooves running vertically to accommodate the two stub axles 28 of the valve ball 24. The two stub axles are designed to be disposed in the recesses 42 to rotatably mount the valve ball. The valve ball 24 and the two stub axles 28 are arranged symmetric with reference to the vertical axis of the valve ball 24 so that stable positioning of the valve ball 24 is possible. The valve ball 24 is shown enlarged in FIG. 5. The valve ball has two symmetrically arranged grooves 26 on a side facing the drive unit A. The two grooves 26 after fitting of the valve ball 24 into the valve body 30 align with the openings 32 in the side recess 31 to facilitate connection of the operating device. The valve ball has a through passage 25 defining a gas flow path through the valve ball, the valve ball being located in the gas flow path of the valve body. The passage 25 through the spherical or cylindrical valve element provided for gas flow is configured circular in cross section or deviating from a circular shape as shown in FIGS. 5A and 5B. Alternatively, the stub axles 28 are arranged eccentric to the orthogonal axis 29 of symmetry of the valve element as shown in FIG. 5C.

Figure 4:
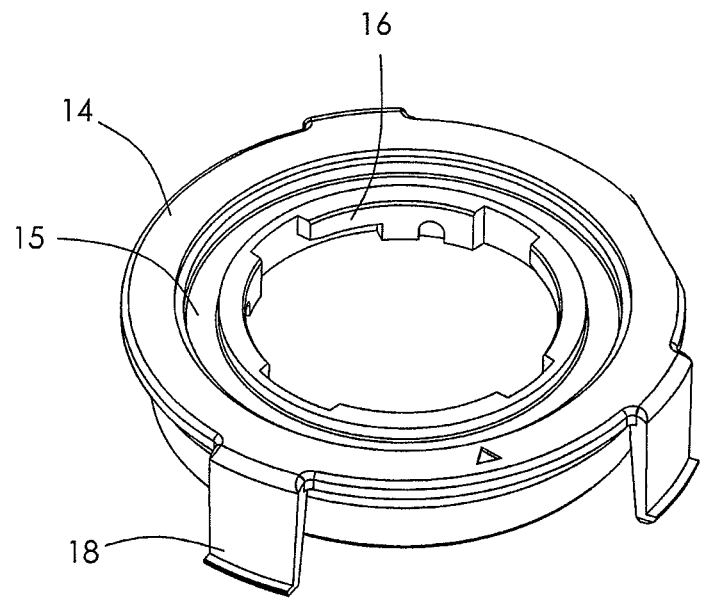
FIG. 4 shows a housing cap, being a part of the valve of FIG. 1.

A housing cap 14 partially closes the upper end of the valve body to capture the valve ball. A sealing element 20 is provided between the valve ball 24 and the housing cap 14. As shown in FIG. 4, the housing cap has closure elements in the form of snap-on elements 18 and bayonet elements 16. The sealing element 20 is arranged to make a sliding seal with the valve ball 24 within the valve body 30 and is compressed between the valve body 30 and the housing cap 14, the housing cap being fixed to the valve body by the shape-mated connection of the snap-on elements 18 of the housing cap with the snap-on element 38 of the valve body. Thus the sealing element 20 is disposed between the housing cap 14 and the valve body 30 and is pressed against the valve ball 24.

Figure 6:
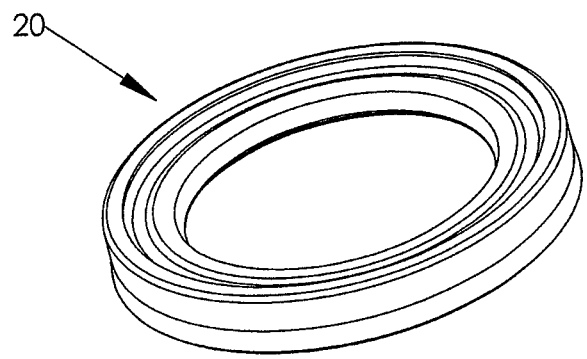
FIG. 6 shows a sealing element, being a part of the valve of FIG. 1.
Figure 7:
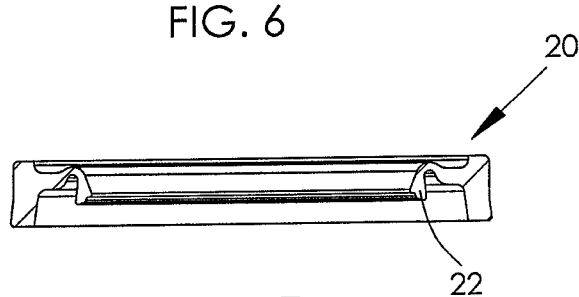
FIG. 7 is a cross sectional view of the sealing element of FIG. 6.

FIGS. 6 and 7 show a perspective view and a cross section of the sealing element 20. The sealing element 20 has a lip seal 22. The inside diameter of the lip seal 22 corresponds to the diameter of the passage 25 through of the valve ball 24 so that the lip of the lip seal 22 can match the opening of the passage. Through this special shape of the sealing element 20 the pressure force is reduced with a simultaneous improvement of robustness relative to tolerance fluctuations and component dimension errors. Because of its geometrically defined flexibility it also offers high long-term stability and optimal tolerance compensation. All this produces a low load torque, lower energy usage of the drive and consequently longer lifetime during battery operation.

Assembly of the entire valve unit "V" is simple. In the first place the valve ball 24 is placed into the valve body 30 through the top opening with the two stub axles 28 fitted into the recesses 42 of valve body. The inside wall of the valve body is shaped to accommodate the valve ball so that no unnecessary friction develops between the inside wall of the valve body and the surface of the valve ball. The sealing element 20 and the housing cap 14 are then positioned from above onto the valve body so that closure of the snap-on elements 18, 38 occurs through a translational movement with the sealing element forming a seal between the valve body and the housing cap as well as being pressed against the valve ball.

In valves known from the prior art the valve ball is mounted on a support arrangement consisting of two 0 rings that are positioned on the outer peripheral surface of the valve ball, one in front of the valve ball and one behind the valve ball. In the valve according to the present invention, because of the positioning of the valve ball 24 according to the invention, only one sealing element 20 is necessary to seal the valve ball 24, namely the one arranged adjacent to the connection unit S. The valve ball 24 is stably positioned by cooperation of the stub axles 30 and the recesses 42 in the valve body 30.

The connection unit S depicted in FIG. 1 comprises a connection adapter for connecting to a gas line etc. The connection adapter has the elements of a bayonet closure 11 which cooperate with the elements of the bayonet closure 16 of the housing cap 14 of the valve unit V. During connection of the modules of the valve unit V and the connection unit S an O-ring 12 to seal the connection is inserted in between and locates in groove 15 of the housing cap.

Figure 8:
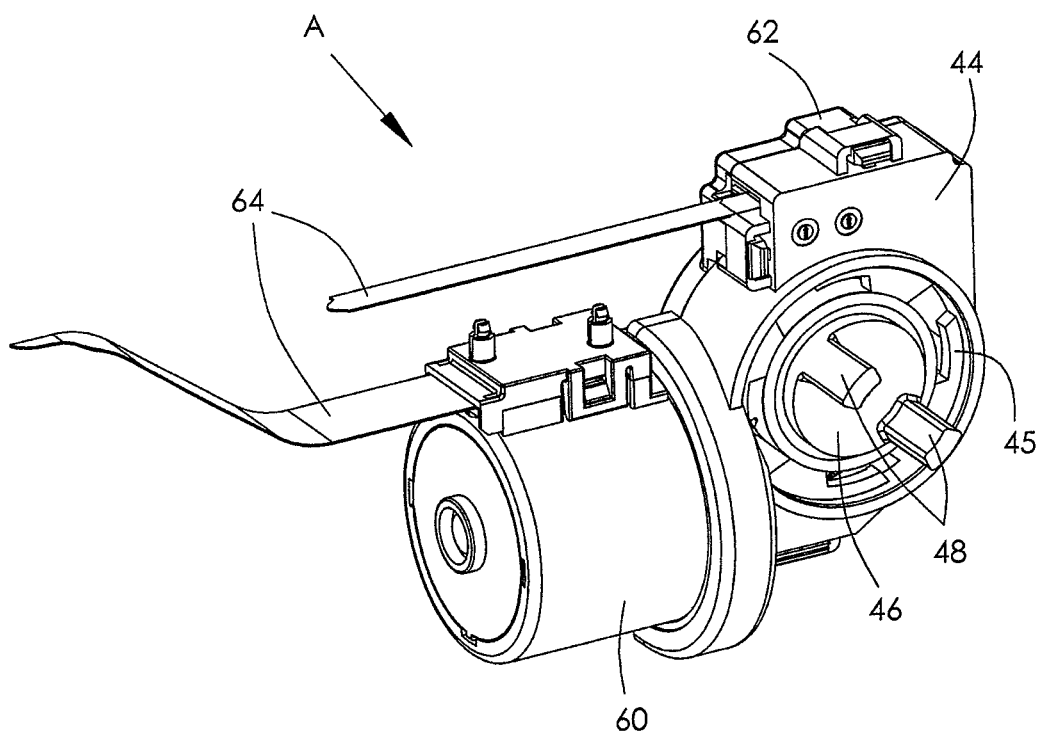
FIG. 8 illustrates a drive unit, being a part of the valve of FIG. 1.

FIG. 8 shows the drive unit A assembled, ready for operation. The drive unit comprises: a gear cover 62, motor 60 with worm 58, a trip cam 56, worm gear 54, switch 50, operating device and gear housing 44. The operating device is referred to hereafter as coupling piece 46.

Figure 9:
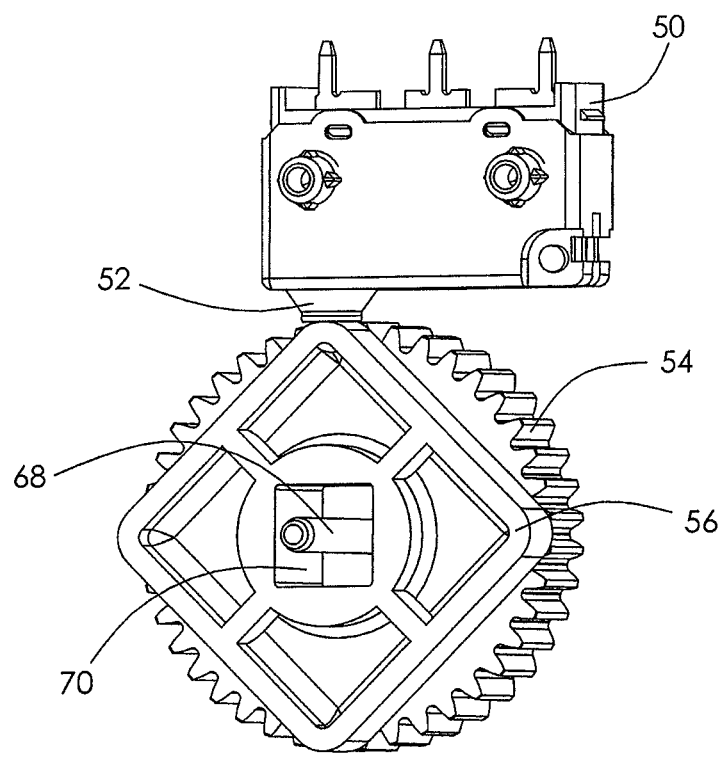
FIG. 9 shows a trip cam and switch, being parts of the valve of FIG. 1.

The worm gear 54 is meshed with the worm 58 such that operation of the motor rotates the worm gear. The worm gear 54, trip cam 56 and switch 50 are shown enlarged in FIG. 9. The trip cam 56 is formed on the worm gear 54. The switch 50 has a pin 52 for operating the switch. The trip cam has a cam surface arranged to contact the pin 52 such that the switch is operated in the open and closed positions of the valve ball.

The gear mechanism includes a worm gear 54 driven by the motor 60 through a worm and is connected to the coupling piece 46. Alternatively, the trip cam 56 may be formed with the coupling piece. The cam surface and the switch being arranged to sense the open and closed positions of the valve element.

The drive unit A of the preferred embodiment uses a single switch 50 and a single trip cam 56, arranged so that the open and closed position of the valve element is recognized by the switch and the motor can be controlled to turn off once the open or closed position is reached. This arrangement of the trip cam is very advantageous, since it leads to a reduction in the number of switches to accomplish position recognition from two, as is used in the prior art, to one.

Figure 10:
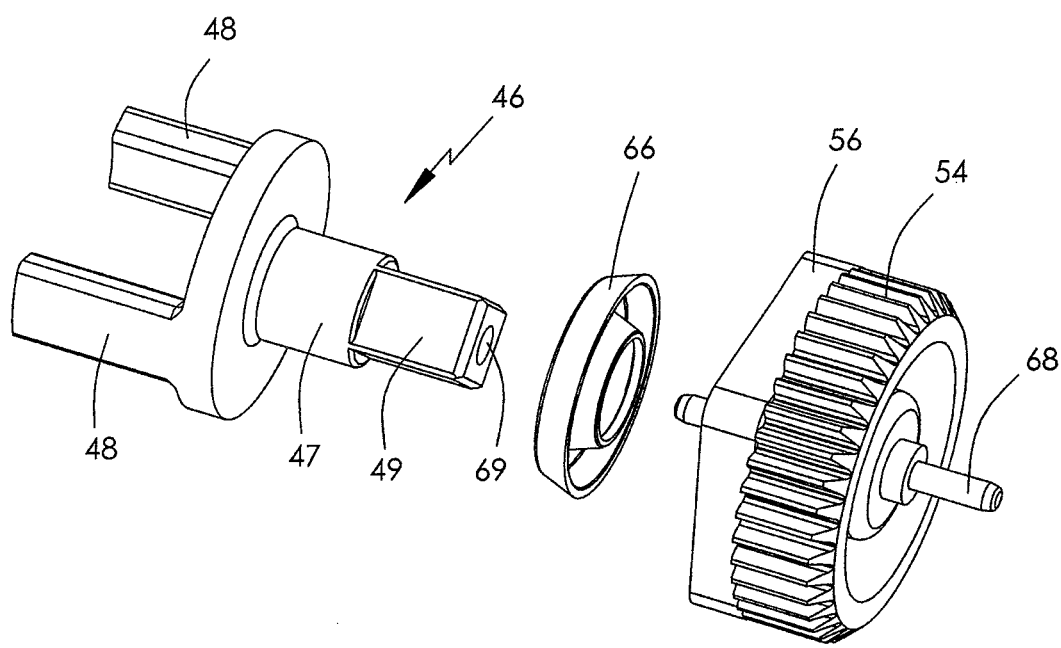
FIG. 10 illustrates a connection between a coupling piece and a worm gear of the drive unit of FIG. 2.

The coupling piece 46, as shown in FIG. 10, comprises a disc portion having two axially extending connectors 48. The disc portion is accommodated in the side recess 31 of the valve body and the connectors 48 extend through the openings 32 and locate within the grooves 26 of the valve element 24 to operate or rotate the valve ball between an open position and a closed position. The openings 32 limit the rotational movement of the connectors 48. The connectors bare against the end stops 34 formed the circumferential ends of the openings at the end of travel, thus limiting the maximum rotational movement of the valve ball.

The coupling piece 46 has a shaft, which engages with a mating piece of the worm gear so as to rotate with the worm gear. The shaft has a square end 49, with an axially extending hole 69. The square end 49 engages a square hole 70 formed in the worm gear and the hole 69 in the end of the shaft accommodates an axle 68 of the worm gear to align and support the coupling piece 46. The shaft also has a cylindrical part 47. A seal 66 is inserted between the gear housing 44 and the cylindrical part 47 of the coupling piece 46 so that no gas flow can develop between the valve unit V and the drive unit A.

By rotation of the coupling piece 46 the valve ball 24 is rotated between the open and closed positions of the valve. The drive unit A is connected to the side recess 31 of the valve body 30 in a modular manner through the shape-mated connection between bayonet elements 36 of the valve unit V and the bayonet elements 45 of the drive unit A. An O-ring seal (not shown) can be inserted between the drive unit A and the valve unit V to prevent gas leakage. The necessary sealing pressure to compress the O-ring seal is achieved by the shape-mated connection.

Optionally, the coupling piece 46 or the worm gear 54 advantageously includes two trip cams 56, configured so that the pin 52 of switch 50 is forced in by the trip cam 56 on coupling 46 or on worm gear 54 both in the open and closed position and issues a signal. Through this configuration of coupling piece 46 with the additional information of the direction of rotation of the valve ball 5 it can be accurately determined whether valve ball 24 is situated in the open or closed position.

It is apparent from the above outline of the invention that the gas valve according to the invention represents an autonomous, compact valve relative to ordinary gas valves, which has an optimal relation between size, flow rate, energy consumption and pressure loss and can be manufactured more simply and cost-effectively.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. An electric motor driven valve for use inside gas meters, comprising:
   at least one valve unit (V) with a valve body and a valve element;
   a drive unit (A); and
   a connection unit (S),
   wherein the units (V), (A), (S) can be connected to each other and separated from each other,
   wherein the valve element is a spherical or cylindrical valve element that is sealed by means of only one sealing element, relative to the valve body,
   wherein the valve body has two recesses in which the valve element is rotatably mounted,
   wherein the sealing element has an annular body portion connected with a lip seal via a thin portion acting as a flexible joint, and
   wherein the valve body comprises a top opening through which the valve element is laced into the valve body, and the recesses of the valve body are elongated grooves extending to the top opening.

2. The valve of claim 1, wherein the units (V), (A), (S) can be connected to each other in modular fashion and separated from each other.

3. The valve of claim 1, wherein the valve body and/or the valve element are made from plastic.

4. The valve of claim 1, wherein the connection unit comprises a housing cap fixed to the valve body, and the sealing element is compressed between the valve body and the housing cap.

5. The valve of claim 1, wherein the valve element has a passage through which the gas flows.

6. The valve of claim 5, wherein the passage has a non-circular cross section deviating from circular.

7. The valve of claim 1, wherein the valve element has two diametrically arranged stub axles with circular cross section, respectively disposed in the recesses of valve body to rotatably mount the valve element.

8. The valve of claim 7, wherein the stub axles are arranged eccentric to the orthogonal axis of symmetry of the valve element.

9. The valve of claim 1, wherein the lip seal extends inwardly from the joint portion, the lip seal having a lip, a radial space being formed between the annular body portion and the lip such that the lip is deformable relative to the annular body portion, an inside diameter of the lip seal corresponding to a diameter of a passage through the valve ball so that the lip of the lip seal can match the opening of the passage.

10. The valve of claim 9, wherein the mounting portion has a free end away from the joint portion, the lip seal has a free end away from the joint portion, the free end of the mounting portion extends beyond the free end of the lip seal, the mounting portion has an axial size greater than that of the lip seal, and the joint portion and the lip seal are located within an area surrounded by the mounting portion.

11. The valve of claim 1, further comprising a radio receiver or radio receiver and a radio transmitter, arranged to exchange information with another radio receiver and/or radio transmitter, for wireless communication and control.

12. The valve of claim 11, wherein electronic components for the radio receiver and/or radio transmitter are arranged directly on a flat conductor or integrated in it.

13. The valve of claim 1, wherein the drive unit (A) has a gear mechanism, which is connected as a modular unit to the valve body by connection of the drive unit (A) to the valve unit (V).

14. The valve of claim 13, wherein the gear mechanism of the drive unit (A) has a coupling piece, which includes two connectors, which cooperate with the valve element for its activation.

15. The valve of claim 14, wherein the coupling piece is operated electromechanically by a worm gear drive of the drive unit (A).

16. The valve of claim 1, wherein the drive unit (A) has a switch and at least one trip cam, the trip cam being arranged to operate the switch when the valve element is in the open position and in the closed position.

17. The valve of claim 16, wherein the motor and the switch are connected to a flat conductor.

18. The valve of claim 17, wherein the flat conductor is equipped with protective electronic components to prevent formation of an igniting spark.

19. The valve of claim 18, wherein the protective electronic components are integrated directly in or on the motor.

20. An electric motor driven valve for use in gas meters, comprising:
   at least one valve unit (V) with a valve body and a valve element;
   a drive unit (A); and
   a connection unit (S),
   wherein the units (V), (A), (S) can be connected to each other and separated from each other,
   wherein the valve element is a spherical or cylindrical valve element that is sealed by means of only one sealing element, relative to the valve body,
   wherein the valve body has two recesses in which the valve element is rotatably mounted, wherein the sealing element has an annular body portion and a lip seal extending inwardly from the annular body portion, the lip seal having a lip, a radial space being formed between the annular body portion and the lip such that the lip is deformable relative to the annular body portion, an inside diameter of the lip seal corresponding to a diameter of a passage through the valve ball so that the lip of the lip seal can match the opening of the passage, and wherein the valve body comprises a top opening through which the valve element is placed into the valve body, and the recesses of the valve body are elongated grooves extending to the top opening.

21. An electric motor driven valve for use in gas meters, comprising at least one valve unit (V) with a valve body and a valve element, a drive unit (A) and a connection unit (S),
   wherein the units (V), (A), (S) can be connected to each other and separated from each other,
   wherein the valve element is a spherical or cylindrical valve element that is sealed by means of only one sealing element, relative to the valve body;
   wherein the valve body has two recesses in which the valve element is rotatably mounted;
   wherein the drive unit has a gear mechanism, which is connected as a modular unit to the valve body by connection of the drive unit to the valve unit;
   wherein the gear mechanism of the drive unit has a coupling piece, which includes two connectors, which cooperate with the valve element for its activation; and
   wherein the lateral recess of the valve body has two elongated openings through which the connectors of the coupling piece extend to connect to the valve element in shape-mated fashion, opposite ends of each of the openings forming a stop for connectors preventing rotation of the valve element beyond 90°.

* * * * *